(12) United States Patent
Schmitz et al.

(10) Patent No.: US 8,602,673 B2
(45) Date of Patent: Dec. 10, 2013

(54) HOUSING FOR A BALL JOINT

(75) Inventors: Jürgen Schmitz, Diepholz (DE); Frank Schmeink, Neuenkirchen-Vorden (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 299 days.

(21) Appl. No.: 12/672,770

(22) PCT Filed: Jul. 30, 2008

(86) PCT No.: PCT/DE2008/050019
§ 371 (c)(1),
(2), (4) Date: Feb. 24, 2010

(87) PCT Pub. No.: WO2009/021507
PCT Pub. Date: Feb. 19, 2009

(65) Prior Publication Data
US 2012/0020723 A1    Jan. 26, 2012

(30) Foreign Application Priority Data

Aug. 14, 2007   (DE) .......................... 10 2007 038 492

(51) Int. Cl.
*F16J 15/52*   (2006.01)
*F16L 51/02*   (2006.01)

(52) U.S. Cl.
USPC .............................. 403/122; 403/50; 403/127

(58) Field of Classification Search
USPC ...................................... 403/50, 51, 122–127
See application file for complete search history.

(56) References Cited

U.S. PATENT DOCUMENTS

| 3,004,786 A | | 10/1961 | Herbenar |
| 3,147,537 A | * | 9/1964 | Fadow ..................... 29/898.044 |
| 3,187,590 A | * | 6/1965 | Duggan .......................... 403/51 |
| 3,381,987 A | * | 5/1968 | Husen ............................. 403/51 |
| 3,403,932 A | * | 10/1968 | Kutcher .......................... 403/51 |
| 3,650,004 A | * | 3/1972 | Bergstrom ................ 29/898.01 |

(Continued)

FOREIGN PATENT DOCUMENTS

| DE | 195 36 035 A1 | 4/1997 |
| EP | 0 766 015 A1 | 4/1997 |

(Continued)

OTHER PUBLICATIONS

Official Office Action issued Mar. 20, 2013 by the Chinese Patent Office regarding corresponding Chinese Patent Application No. 200880103366.4.

*Primary Examiner* — Gregory Binda
*Assistant Examiner* — Nahid Amiri
(74) *Attorney, Agent, or Firm* — Davis & Bujold, PLLC; Michael J. Bujold

(57) ABSTRACT

A housing component for a ball joint which has an interior space (3) for mounting the joint ball (1) of a ball journal, an opening (4) for guiding the journal section (5) of the ball journal (2) adjoining the joint ball (1), a contact region (7) formed on an outer lateral surface of the housing (6) for fastening a sealing bellows edge (8) thereto and forming a seal, and a deformed section (9) which rotationally and pivotally fixes the joint ball (1) of the ball journal (2) in the interior space (3) of the housing (6). The deformed section (9) has a smaller material cross-section in comparison to the contact region (7) for the sealing bellows edge (8).

20 Claims, 2 Drawing Sheets

(56) References Cited

U.S. PATENT DOCUMENTS

| | | |
|---|---|---|
| 5,997,208 A | 12/1999 | Urbach et al. |
| 6,044,543 A | 4/2000 | Dorth et al. |
| 6,773,196 B2 | 8/2004 | Broker et al. |
| 7,357,591 B2 * | 4/2008 | Broker et al. ............. 403/132 |
| 7,862,250 B2 * | 1/2011 | Kuru ............................ 403/134 |
| 2003/0077114 A1 | 4/2003 | Broker et al. |
| 2006/0153632 A1 * | 7/2006 | Bernhardt et al. ............ 403/122 |

FOREIGN PATENT DOCUMENTS

| | | |
|---|---|---|
| EP | 1 069 024 A1 | 1/2001 |
| GB | 1 177 973 | 1/1970 |
| GB | 1 525 338 | 9/1978 |
| JP | 58 008820 | 1/1983 |
| WO | 01/59312 A2 | 8/2001 |

* cited by examiner

HOUSING FOR A BALL JOINT

This application is a National Stage completion of PCT/DE2008/050019 filed Jul. 30, 2008 which claims priority from German patent application Ser. No. 10 2007 038 492.2 filed Aug. 14, 2007.

FIELD OF INVENTION

The invention relates to a housing for a ball joint.

BACKGROUND OF THE INVENTION

A method is known from DE 195 36 035 A1 for the production of a housing for a ball joint, in particular for tie rods of motor vehicles, and a housing for a ball joint produced by this method. The housing has an interior space adapted for mounting the joint ball of a ball journal and also an opening for guiding through the journal section of the ball journal adjoining to the joint ball. The housing is open on both sides and on one side is closed by a cover, wherein a deformed section is provided at the upper edge of the housing for fixing the cover. The closure is affected by means of a cover after the ball journal was inserted into the interior space of the housing, together with a bearing shell supporting the joint ball. The journal section of the ball journal protrudes from the opening of the housing on the side opposite of the cover. In order to seal the inner joint components, a sealing bellows is provided, wherein an edge region of the sealing bellows rests against and seals a contact region of the outer lateral surface of the housing. In the solution known from DE 195 36 035 A1, the side having the opening for passage of the journal section of the ball journal has a contact shoulder on which the bearing shell inserted in the interior space rests.

In particular with regard to ball joints for motor vehicles, housings are known in which a deformed section is present for the rotationally and pivotably movable fixation of the joint ball of the ball journal in the interior space of the housing—in addition to a contact region present on the outer lateral surface of the housing for sealing attachment of the sealing bellows edge. To this end, after inserting the ball journal into the interior space of the housing, the existing opening is deformed to a limited extent in the direction of the center of the housing, such that in this manner automatic loosening of the ball journal from the housing is prevented. This type of attachment of the ball journal inside the housing of a ball joint can be used both for housings open on one side or on both sides.

If a contact region for the sealing attachment of the sealing bellows edge, and also a deformed section for the rotationally and pivotably movable fixation of the joint ball of the ball journal in the interior space of the housing to the opening side of the housing are both provided on a housing for a ball joint, then the disadvantage results in the potential that the sealing bellows edge detaches from the fixed position thereof at the housing and slides across the already deformed section. This event may occur during the deformation of the deformed section, if the contact region for the sealing bellows edge is also deformed at least in part. However, any mobility of the sealing bellows edge means that the sealed contact of the sealing bellows edge against the housing is no longer ensured in a reliable manner in every case, and thus the danger exists that moisture and impurities can penetrate into the interior of the joint. Damage to the joint components resulting in this manner can ultimately lead to complete failure of the ball joint. This must be absolutely prevented, in particular when using the housing for ball joints in motor vehicles, since these are safety components.

SUMMARY OF THE INVENTION

The invention is based on the problem of producing a housing component for a ball joint which ensures permanent and reliable sealing by means of a tight fit of the sealing bellows edge against the contact region provided for this purpose on the housing, over the entire life cycle of the ball joint.

A housing for a ball joint having an interior space adapted for mounting the ball joint of a ball journal, an opening for guiding through the journal section of the ball journal adjoining the joint ball, a contact region present at the outer lateral surface of the housing for the sealed attachment of a sealing bellows edge, and a deformed section for the rotationally and pivotably movable fixation of the joint ball of the ball journal in the interior space of the housing, has been refined according to the invention in that the deformed section has a smaller material cross-section in comparison to the contact region for the sealing bellows edge.

Due to the claimed configuration of the opening region of the opening for guiding through the journal section of the ball journal, the housing has a projection at the outer lateral surface thereof, which serves as a contact region for the sealed attachment of the sealing bellows edge. This contact region having a thickened cross-section in comparison to the deformed section remains unaffected during the deformation of the deformed section, such that the design configuration of the contact region can be tailored precisely to the dimensions of the sealing bellows edge. Due to the resulting graduation of the housing in the section on the open side, the regions of contact of the sealing bellows edge and of the deformed section are separated from each other. The deformation of such housings has thus become much simpler during the assembly of the ball joint, in comparison to the solutions known from the prior art. The reliability and durability of the seal was improved significantly by the measure according to the invention.

A first embodiment of the invention consists in that a transition region, the contour of which corresponds to the course of the deformed section after the deformation thereof, is present between the deformed section and the contact region. In this manner, a stepped, but largely smooth transition can be created between the contact region for attachment of the sealing bellows edge and the deformed section. After the completion of the ball joint equipped with a housing according to the invention, the transition region can no longer be detected. Rather, during the deformation of the deformed section, the transition region precisely adapts to the course thereof.

Therefore, another refinement of the invention proposes that the transition region be formed by at least one radius. However, it is preferable to provide a plurality of radii merging seamlessly into each other in the transition region. With this seamless transition created by the radii between the contact region for attachment of the sealing bellows edge and the deformed section, the additional advantage is that no sharp-edged transitions are present on the housing. Sharp-edge transitions of this kind might cause premature damage to the region of contact of the sealing bellows edge which is essential to the sealing of the ball joint.

A special embodiment of the housing according to the invention further consists in that the contact region for the sealing bellows edge has a circular cylindrical, tapered or conical shape. With the preferred circular cylindrical shape of the contact region, a surface is obtained which ensures an optimum sealing effect between the contact region and the sealing bellows edge resting thereon.

The configuration of the contact region as a cone or taper can additionally improve the sealing contact of the sealing bellows edge, or have a supporting effect in that the sealing bellows edge does not detach from the contact region.

In addition, sealing contours such as gear tooth-shaped structures are conceivable, so that an engaging of the contact region and of the sealing bellows edge can take place.

In order to simplify the production of the housing, it is also advantageous for the deformed section, before the deformation thereof, to have the geometry of a hollow circular cylinder, of a taper or a cone. Thus the deformed section also preferably has a circular cylindrical shape, which simplifies the deformation of the deformed section and in addition, after insertion of the joint ball of the ball journal, optimum contact of the deformed section against the joint ball and/or against the support region of the joint ball is possible. The conical or tapered course of the deformed section can be designed such that it is aligned, for example, as a mirror-image to the conical or tapered contact region.

However, according to the invention it is of great importance for the design of the contact region and of the deformed section that the outside diameter of the deformed section is smaller than the outside diameter of the contact region for the sealing bellows edge, such that the solution according to the invention can be implemented according to which the deformed section has a smaller material cross-section in comparison to the contact region. This reduction, like the conical or tapered geometries, can be defined by the course of the contour.

In order to simplify the assembly of a ball joint equipped with the housing according to the invention, it is further proposed that the deformed section can be deformed by means of a cold forming process or a rolling process. These manufacturing processes, which are known per se, prove to be particularly advantageous for a solution according to the invention because they can be employed at low cost and low energy consumption and the manufacturing expense is small.

A particularly advantageous embodiment of the invention consists in that the contact region for the sealing bellows edge is arranged in a section of the housing through which a plane extends, which runs through the center of the joint ball and orthogonal to the longitudinal axis of the non-deflected ball journal.

Optimum sealing can be created due to this contact for the sealing bellows edge located roughly in the center of the housing. The tensile stress acting on the sealing bellows due to the pivoting of the ball journal on the sealing bellows and/or the torsion applying stress on the sealing bellows can be compensated in this way. In this regard the sealing bellows has a length which allows it to be designed in a helical shape having a plurality of pleats, such that it can compensate for the movements due to the inherent elasticity thereof and does not detach from the contact region thereof.

If the contact region for the sealing bellows edge is provided roughly at the level of the center of the joint ball, it is particularly advantageous for radial joints. Radial joints of this kind usually have a shaft which protrudes laterally from the housing and is used to connect the housing later to corresponding components. This shaft running radially with respect to the longitudinal axis of the non-deflected ball journal directly adjoins the contact region for the sealing bellows edge. It was found that due to the claimed design of the housing, the connection of the shaft in radial joints is associated with smaller flexural stresses under load. This represents an additional, very important advantage of the embodiment described herein.

In the course of the simplification of the overall manufacturing process for a claimed housing for a ball joint, an additional proposal is that the housing as a whole is produced by a cold extrusion method or by a forging process. When using a cold extrusion method, advantageously all process steps for producing the housing can be implemented in sequence, without requiring any power-consuming heating of the material.

However, the forging process has the advantage that although it is indeed more energy-intensive, the production of the housing is possible with tighter component tolerances. In the case of a hot forged housing, it is even possible to produce the contact region for the sealing bellows edge and/or the deformed section during forging, thereby requiring no finishing any longer. Likewise, this result can also be achieved by a calibration process. But in such cases, subsequent machining is indispensible.

Moreover, at least the contact region for the sealing bellows edge and/or the deformed section of the housing produced by a forging process can be a subsequently machined section. Due to the subsequent machining of individual sections of the housing, a housing produced in this manner can be created with tight tolerances and lower consumption of materials. In addition, housings produced by a forging process have high component strength and due to the material properties thereof, allow good deformability.

BRIEF DESCRIPTION OF THE DRAWINGS

The invention will be explained in greater detail below based on the attached drawings. The illustrated embodiment does not constitute any restriction on the illustrated variant, but rather is intended solely to illustrate the principle of the invention. In order to be able to illustrate the mode of operation of the invention, the figures show only highly simplified, basic sketches in which components or elements not essential to the invention were omitted. However, this does not mean that such components or elements are not present on the invented embodiment.

Shown are.

DETAILED DESCRIPTION OF THE PREFERRED EMBODIMENTS

Figure 1:
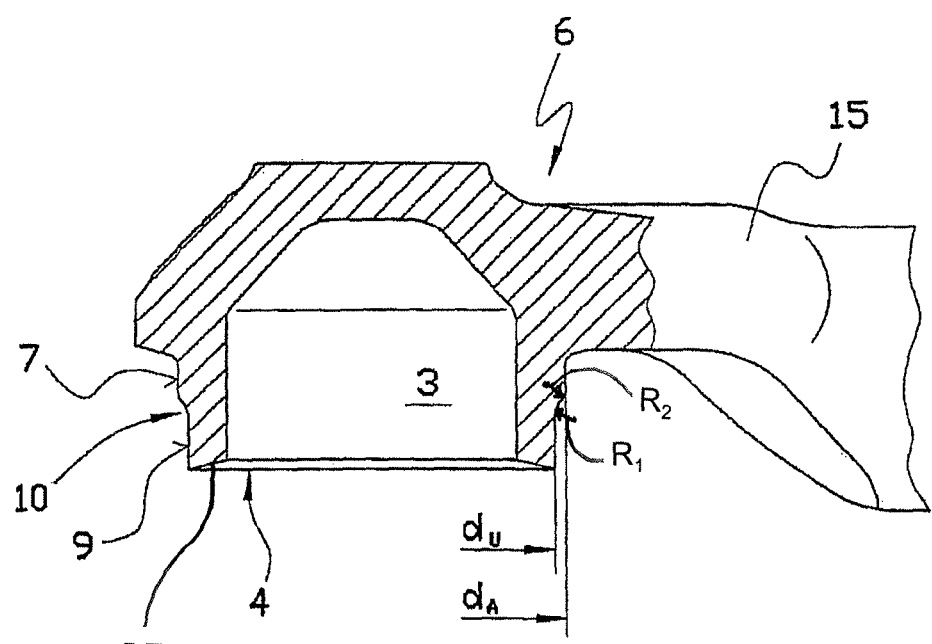
FIG. 1: a partial sectional view of a section of the head region of a housing for a ball joint

The housing illustrated in FIG. 1 and denoted overall by reference number 6 has a shaft 15 by which the housing 6 can be attached to a corresponding component. In the housing 6, an interior space 3 is present, the configuration of which allows accommodation of the joint ball of a ball journal, and also of a bearing shell supporting this joint ball. The special embodiment of a housing 6 according to the illustration in FIG. 1 is designed as a housing 6 open on one side. Accordingly, the housing 6 has an opening 4. During installation of the ball joint, an assembly comprising the ball journal and the bearing shell placed onto the joint ball of the ball journal, can be introduced through this opening 4 into the housing 6. In the region on the opening side, the housing 6 first has a contact region 7 for the sealing contact of a sealing bellows edge. The contact region 7 is designed in this case as a circular cylindrical contact surface and consequently has a diameter $d_4$. Viewed in the direction of the opening 4 a deformed section 9 is present underneath the contact region 7; after insertion of the joint ball of the ball journal into the interior space 3 of the housing 6, the deformed section ensures the fixation of the joint ball of the ball journal in the interior space 3 by means of a deformation occurring toward the center of the joint. The deformation of the deformed section 9 occurs such that the joint ball remains rotatable and pivotable inside the interior space 3. To this end, it is particularly advantageous if the deformation occurs while simultaneously measuring the resistance torque, so that the friction values occurring between the joint ball and the bearing components accommodating it can be determined, and so that the ball joint produced in this way has precisely definable friction values. The outside diameter $d_U$ of the deformed section 9, as is clearly apparent from the illustration in FIG. 1, is smaller than the outside diameter $d_A$ of the contact region 7, so that during subsequent deformation of the deformed section 9 occurring for installation of the joint, no influence is exerted on the contact region 7. In this regard, the contact region 7 is designed such that optimum sealing is possible. A transition region 10 is present between the contact region 7 and the deformed section 9 and comprises a plurality of radii $R_1$ and $R_2$ merging smoothly into each other. Therefore, the transition region 10 has a contour which corresponds to the course of the deformed section 9 after the deformation thereof.

Figure 2:
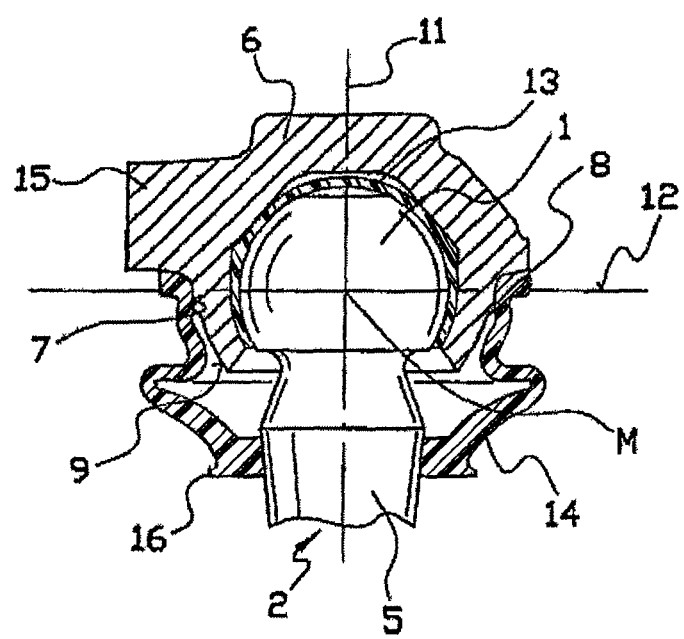
FIG. 2: a partial sectional view and sectional view of a ball joint having a housing according to the invention.

A ball joint is illustrated in FIG. 2, which has a housing 6 according to the present invention. As was already explained in connection with FIG. 1, this housing 6 has a radially protruding shaft 15. A bearing shell 13 is inserted into the interior space 3 of the housing 6 and the outer lateral surface of this bearing shell rests in wide regions directly against the interior surface of the interior space 3. The bearing shell 13 is made of plastic and has limited elastic properties and, with the interior lateral surface thereof, which in the present case is designed ball-shaped, accommodates the joint ball 1 of a ball journal 2. In the illustration of FIG. 2, the ball journal 2 is shown in a non-deflected position. Underneath the joint ball 1, the ball journal 2 transitions into a journal section 5. A sealing bellows 14 is used to seal the moving, inner joint components with respect to the surroundings. This bellows has a first sealing bellows edge 8, which rests against the outer lateral surface of the housing 6, and also a sealing bellows edge 16 which is located opposite of the housing and rests directly against the journal section 5 of the ball journal 2. The sealing bellows edge 8 rests sealingly against the contact region 7 of the housing 6. This contact region 7 of the housing 6 has a larger diameter than the deformed section 9 of the housing 6 located on the opening side underneath. As is apparent from the illustration in FIG. 2, the deformed section 9, having a beveled end BE, was deformed to fix the joint ball 1 and the bearing shell 13 in the housing 6 of the ball joint in the direction of the center of the joint. During this deformation process of the deformed section 9, the transition region 10 between the contact region 7 and the deformed section 9 is adapted at the same time, such that the transition region 10 is no longer visible in the assembled ball joint. In order to prevent sharp-edged transitions, in this section of the housing 6 preferably radii are used such that here a smooth and continuous transition can be created between the individual housing sections. It is furthermore important in the illustration in FIG. 2 that the sealing bellows edge 8 is located in a plane 12 which runs orthogonal to the longitudinal axis 11 of the non-deflected ball journal 2, and furthermore runs through the center M of the joint ball 1. Therefore, the sealing bellows edge 8 is arranged approximately in the center of the joint, which is associated with the essential advantage that it can optimally compensate for stresses produced by the movement of the ball journal 2 inside the housing 6.

List of Reference Symbols
1 Joint ball
2 Ball journal
3 Interior space
4 Opening
5 Journal section
6 Housing
7 Contact region
8 Sealing bellows edge
9 Deformed section
10 Transition region
11 Longitudinal axis
12 Plane
13 Bearing shell
14 Sealing bellows
15 Shaft
16 Sealing bellows edge on journal side
M Center of joint ball
$d_U$ Diameter of deformed section
$d_A$ Diameter of contact region

The invention claimed is:

1. A housing for a ball joint, the housing comprising:
an interior space (3) adapted for mounting a joint ball (1) of a ball journal (2);
an opening (4) having an initial dimension for receiving a journal section (5) of the ball journal (2) adjoining the joint ball (1);
a contact region (7) is provided along an outer lateral surface of the housing (6) for sealing engagement with a sealing bellows edge (8);
a deformed section (9) for rotationally and pivotably retaining the joint ball (1) of the ball journal (2) within the interior space (3) of the housing (6), and the deformed section (9), following deformation thereof, reducing the initial dimension of the opening (4) of the housing (6) so as to captively retain the joint ball (1) within the interior space (3) of the housing (6) while the joint ball (1) still remains rotatable and pivotable with respect to the housing (6), the joint ball being retained solely by the deformed section;
the deformed section having a beveled end that defines the opening; and
the entire deformed section (9) having a smaller longitudinal thickness than the contact region (7) for the sealing bellows edge (8).

2. The housing for the ball joint according to claim 1, further comprising a transition region (10) located between the deformed section (9) and the contact region (7), a contour of the transition region (10) corresponds to a course of the deformed section (9) after the deformation thereof, the transition region forming a graduation in the housing between the contact region and the deformed section such that the deformed section is spaced from contact with a sealing bellows.

3. The housing for the ball joint according to claim 2, wherein the transition region (10) is formed by at least one radius.

4. The housing for the ball joint according to claim 2, wherein the transition region (10) is formed by a plurality of radii smoothly merging together with one another.

5. The housing for the ball joint according to claim 1, wherein the contact region (7), for the sealing bellows edge (8), has one of a circular and a cylindrical shape.

6. The housing for the ball joint according to claim 1, wherein the housing comprises the outer lateral surface and an inner lateral surface, the deformed sections of the inner and the outer lateral surfaces of the housing are arcuate, the inner lateral surface defines the interior space, the joint ball is received within a bearing shell which is received within the interior space such that the inner lateral surface contacts only the bearing shell and an inner surface of the bearing shell, which is opposite the housing, contacts only the joint ball.

7. The housing for the ball joint according to claim 1, wherein an outside diameter of an entire axial length of the deformed section (9) is smaller than an outside diameter of the contact region (7) for the sealing bellows edge (8).

8. The housing for the ball joint according to claim 1, wherein the deformed section (9) is deformed by one of a cold forming process and a rolling process in which the deformed section (9) is at least partially heated.

9. The housing for the ball joint according to claim 1, wherein the contact region (7), for the sealing bellows edge (8), defines a plane (12) that is perpendicular to a longitudinal axis (11) of a non-deflected ball journal (2) and extends through a center (M) of the joint ball (1).

10. The housing for the ball joint according to claim 1, wherein the housing (6) is produced by one of a cold extrusion method and a forging process, and at least one of the contact region (7), for the sealing bellows edge (8), and the deformed section (9) of the housing (6), produced by a forging process, is finished by a machining process.

11. The housing for the ball joint according to claim 1, wherein the deformed section (9) of the outer lateral surface of the housing (6) is arcuate.

12. The housing for the ball joint according to claim 1, wherein an interior surface of the housing defines the interior space of the housing which receives a bearing shell (13) which receives the joint ball and solely separates the housing (6) from the joint ball (1).

13. The housing for the ball joint according to claim 1, wherein an inner surface of the housing (6) slopes radially inwardly toward the opening, a bearing shell is arranged within the interior space and receives the joint ball such that the inner surface of the housing contacts only the bearing shell.

14. The housing for the ball joint according to claim 1, wherein a graduation is formed in the housing between the contact region and the deformed section such that a sealing bellow (14) which seals the interior space, contacts the housing only at the contact region (7) and is spaced from the deformed section (9).

15. The housing for the ball joint according to claim 1, wherein the interior space of the housing receives a bearing shell (13) which receives the joint ball and curves radially inwardly due to deformation of the deformed section (9), the housing further comprises a shaft that extends from the housing and directly adjoins the contact region.

16. The housing for the ball joint according to claim 15, wherein an internal surface of the housing defines the interior space of the housing, an external surface of the bearing shell (13), adjacent the deformed section (9), is substantially flush with the internal surface of the deformed section (9) of the housing along an entire length of the internal surface of the deformed section (9).

17. The housing for the ball joint according to claim 1, wherein the deformed section (9) retains a bearing shell (13) within the housing (6) such that only the bearing shell and the joint ball are retained within the interior space.

18. The housing for the ball joint according to claim 1, wherein an inwardly facing surface of the deformed section (9) is curved for retaining the joint ball (1) of the ball journal (2) within the housing (6).

19. A ball joint housing comprising:
an interior space (3) for receiving a joint ball (1) of a ball journal;
an opening (4) having an initial dimension for receiving a journal section (5) of the ball journal (2) to which the joint ball (1) is fixed;
a contact region (7) formed on an outer lateral surface of the housing (6) for engaging and sealing with a first edge (8) of a sealing bellows (14) to form a seal therewith;
a deformed section (9) for rotationally and pivotably retaining the joint ball (1) of the ball journal (2) within the interior space (3) of the housing (6), and the deformed section (9), following deformation thereof, reducing the initial dimension of the opening (4) of the housing (6) so as to captively retain the joint ball (1) within the interior space (3) of the housing (6) while the joint ball (1) still remains rotatable and pivotable with respect to the housing (6), the joint ball being retained solely by the deformed section;
the deformed section having a beveled end that defines the opening, and
the entire deformed section (9) having a smaller longitudinal thickness than the contact region (7) for the sealing bellows edge (8).

20. A ball joint housing comprising:
an interior space (3) for receiving a joint ball (1) of a ball journal, the interior space defining an longitudinal axis;
an opening (4) for receiving a journal section (5) of the ball journal (2) to which the joint ball (1) is fixed, the opening defining a plane that is normal to the longitudinal axis;
an outer lateral surface of the housing extends axially from the opening and comprises a deformed section, a transition region and a contact region, the deformed section axially bordering the opening and the transition region and the transition region axially bordering the deformed section and the contact region;
the contact region (7) of the outer lateral surface of the housing (6) for engaging and sealing with a first edge (8) of a sealing bellows (14) to form a seal therewith;
the deformed section (9) for rotationally and pivotably retaining the joint ball (1) of the ball journal (2) within the interior space (3) of the housing (6), and the deformed section (9), following deformation thereof, captively retaining the joint ball (1) within the interior space (3) of the housing (6) while the joint ball (1) still remains rotatable and pivotable with respect to the housing (6);
the deformed section (9), following deformation thereof, retains a bearing shell (13) within the housing (6), and curves the bearing shell (13) radially inwardly due to deformation of the deformed section (9), the deformed section retaining only the bearing shell and the joint ball within the interior space; and
the outer lateral surface of the housing tapers such that a lateral cross-sectional dimension of the ball joint housing continually reduces along the deformed section from the transition region to the opening.

* * * * *